June 20, 1950  R. E. WATSON  2,512,046
CONTROL VALVE DEVICE
Filed May 22, 1947  2 Sheets-Sheet 1

INVENTOR.
Robert E. Watson
BY Frank E. Miller
his ATTORNEY

Patented June 20, 1950

2,512,046

UNITED STATES PATENT OFFICE 2,512,046

CONTROL VALVE DEVICE

Robert E. Watson, Edgewood, Pa., assignor to The Westinghouse Air Brake Company, Wilmerding, Pa., a corporation of Pennsylvania Application May 22, 1947, Serial No. 749,677

8 Claims. (Cl. 303—26.)

This invention relates to control valve devices and more particularly to a control valve device for use in fluid pressure brake equipment of the type disclosed in the patent to E. E. Hewitt et al., No. 2,173,940, issued September 26, 1939.

While locomotives equipped with brake equipment of the type disclosed in the aforementioned patent meets entirely the present day braking requirements of the various railroads when run as a live engine, it has been found that when a locomotive so equipped is hauled as a dead engine in a train, the control of the brakes on the dead engine may be adversely affected by reason of an independent application and release piston not moving completely into its application position.

One object of the invention is therefore to provide, in a brake equipment of the type disclosed in the aforementioned patent, improved means for positively eliminating the above mentioned undesirable feature.

Another object of the invention is to provide a multipiston controlled valve device in which slight misalignments of the piston bores will not adversely affect or interfere with the operation of the valve device.

Other objects and advantages will appear in the following more detailed description of the invention.

Figure 1:
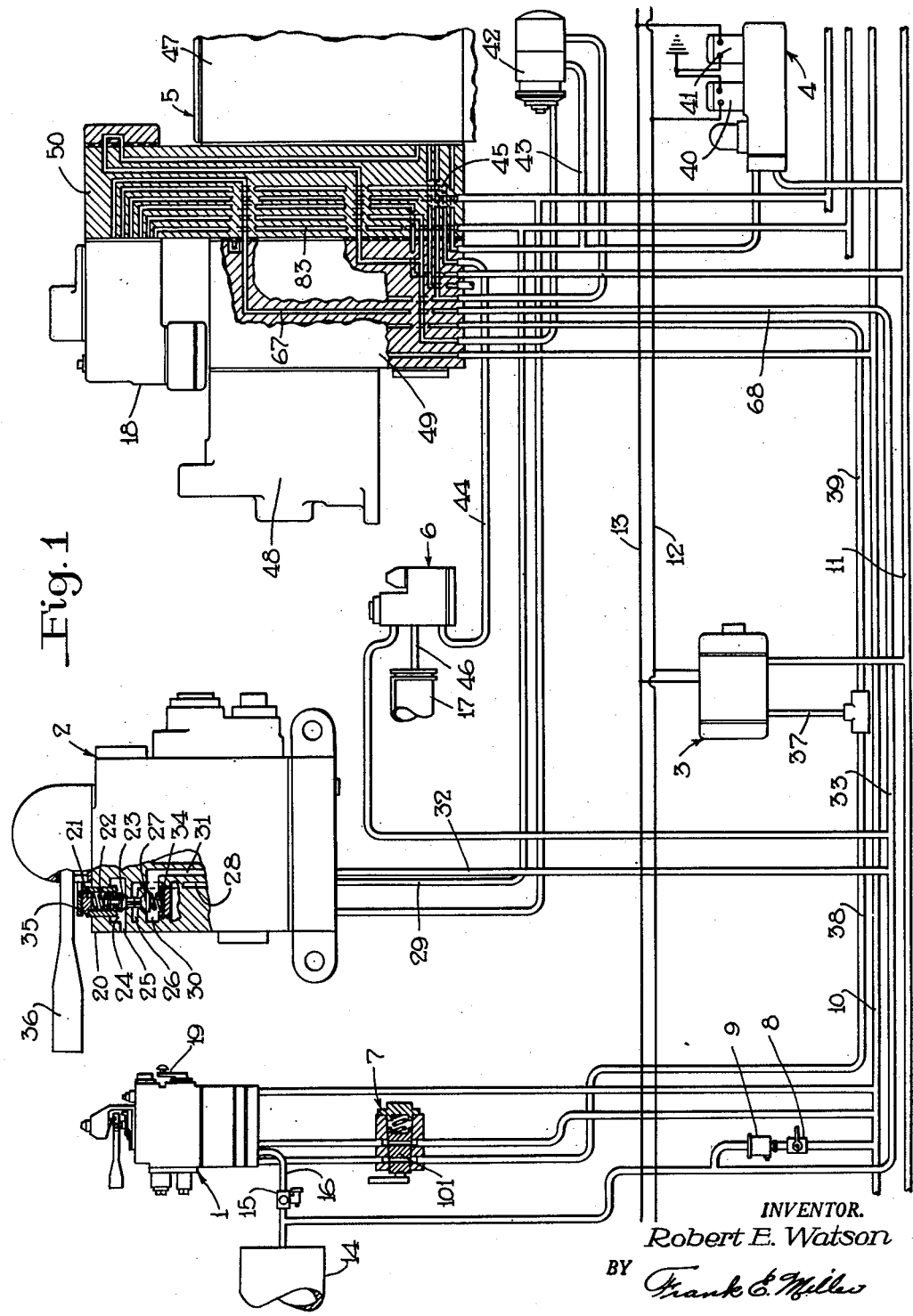
Figure 2:
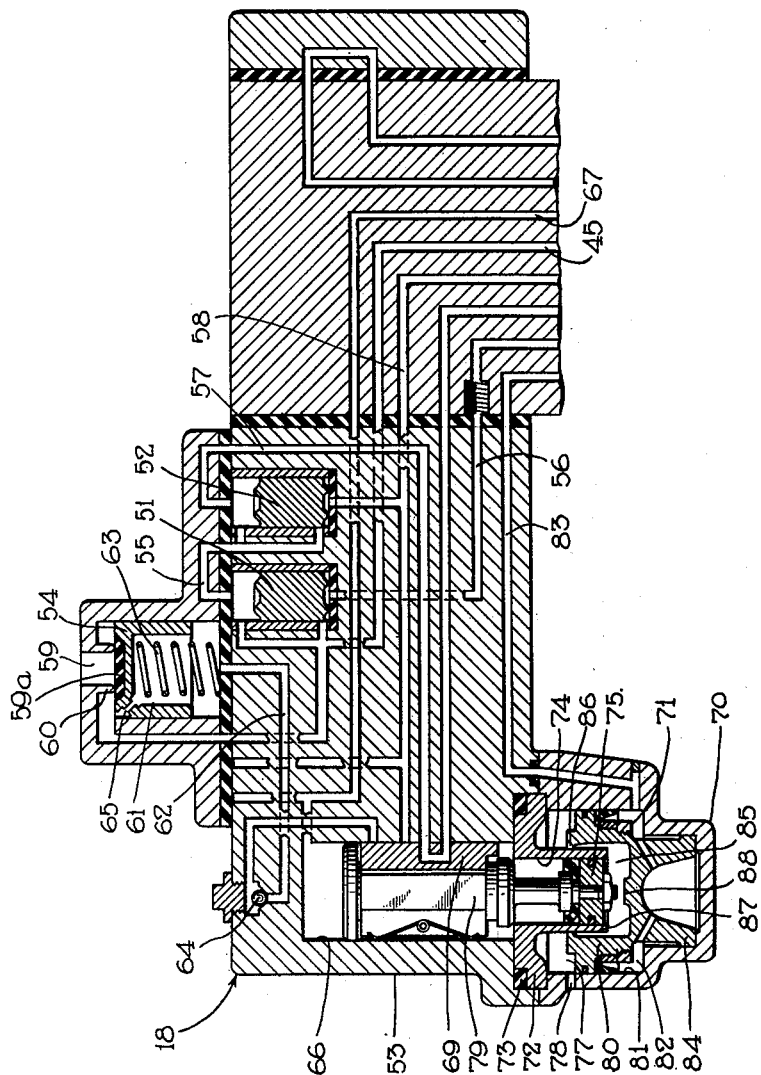

In the accompanying drawings:

Fig. 1 is a diagrammatic view, partly in section and partly in outline, of a locomotive brake equipment embodying the invention; and, Fig. 2 is an enlarged sectional view of an interlock portion of the control valve device shown in Fig. 1.

As shown in Fig. 1 of the drawings, the locomotive brake equipment comprises a combined automatic and straight air brake valve device 1, an independent brake valve device 2, a master switch 3, an application and release magnet valve device 4, a control valve device 5, a relay valve device 6, a double heading cock 7, and in addition, the usual apparatus to be rendered effective when hauling a dead engine, which apparatus comprises a cut-out cock 8 and a combined air strainer and check valve device 9.

The equipment further comprises a brake pipe 10; a straight air pipe 11, application and release wires 12 and 13, respectively, these pipes and wires extending through the locomotive from one end to the other end being provided at their opposite ends with suitable couplings or connectors (not shown) for connecting same to like pipes and wires on other vehicles of the train.

The brake equipment further comprises a main reservoir 14 adapted to be supplied with fluid under pressure in the usual manner, a feed valve device 15 operates to supply fluid under pressure from said reservoir to a feed valve pipe 16 at the reduced pressure desired to be carried in the brake pipe 10, and a brake cylinder 17 responsive to the pressure of fluid supplied thereto to apply the brakes on the locomotive.

It will be understood that the equipment shown in Fig. 1 is substantially the same as the equipment shown and described in the aforementioned patent, and that with the exception of an interlock portion 18 of the control valve device 5 shown in section in Fig. 2 and hereinafter described in detail, the parts of the equipment shown in Fig. 1 may be identical in construction and operate in a similar manner to corresponding parts of the equipment disclosed in the aforementioned patent. However, in the present application only those parts of the equipment are shown and described which are deemed necessary to have a clear understanding of the invention.

Briefly described, the combined automatic and straight air brake valve device 1 comprises means by which the engineman may control the brakes on the locomotive and cars of a train either by straight air by way of the straight air pipe 11 or automatically through the medium of fluid under pressure in the brake pipe 10, a selector 19 being provided for the engineman to select either the straight air or the automatic control of the locomotive and train brakes.

The independent brake valve device 2 is provided for controlling the brakes on the locomotive independently of the brakes on the cars of the train and is similar to that disclosed in Patent No. 2,173,940, issued September 26, 1939. This brake valve device is provided with means for controlling the operation of a self-lapping application and release valve mechanism, a cut-off valve, an application delay valve, and a lockout valve mechanism 20. Since a detailed description of the lockout valve mechanism 20 only is deemed essential to a clear understanding of the invention, a detailed showing and description of the other above mentioned parts of the independent brake valve device 2 have been omitted.

The lockout valve mechanism 20 comprises a plunger 21 slidably mounted in a suitable bore in the brake valve casing and carried by a spring 22 supported on a valve 23. The valve 23 is contained in a chamber 24 which is always open to atmosphere by way of a vent port 25.

The valve 23 is slidably mounted in a suitable bore in the casing by means of a fluted stem which extends through said bore into a chamber 26 where it engages a fluted stem of an oppositely disposed valve 27. The chamber 26 is connected by way of a passage 28 to a pipe 29 leading to the interlock portion 18 of the control valve device 5. The valve 27 is contained in a chamber 30 which is connected to the main reservoir 14 by way of a passage 31, a branch pipe 32 and a main reservoir pipe 33. A spring 34 is disposed in the chamber 30 so as to act on the valve 27 in a direction for seating said valve and for unseating the valve 23, the spring 34 being of sufficient strength to be able to act through the medium of said valves and the spring 22 to hold the plunger 21 in its normal position in which it is shown in the drawing.

Resting on the upper end of the plunger 21 is a bail 35 pivotally mounted in the casing, by means not shown, for engagement by handle 36 and for downward movement thereby against the upper end of the plunger 21. Continued downward movement of the handle 36, acting through the medium of the bail 35, plunger 21 and spring 22, is adapted to effect seating of the valve 23 and unseating of the valve 27 against the pressure of the spring 34. The release of manual pressure on the handle 36 permits operation of spring 34 to seat valve 27 and unseat valve 23, all of which is described in the aforementioned patent.

The master switch 3 is provided for controlling the energization and deenergization of the application and release wires 12 and 13 when straight air control of the brakes is used. This switch 3 comprises a diaphragm assemblage (not shown) subject to the opposing pressures of fluid in the straight air pipe 11 and fluid in a control pipe 37 which may be connected at one time to a service control pipe 38 and at another time to an emergency control pipe 39.

The application and release magnet valve device comprises an application magnet 40 and a release magnet 41. One terminal of the magnet 40 is connected to the application wire 12 and one terminal of the magnet 41 is connected to the release wire 13 while the other terminal of each magnet is connected to ground.

The release magnet 41 operates upon energization to seat a release valve (not shown) for closing an atmospheric communication to the straight air pipe 11. Deenergization of the magnet 41 permits a spring (not shown) to unseat the release valve.

The application magnet 40 upon energization operates to unseat an application valve (not shown) so as to supply fluid under pressure from an auxiliary reservoir 42 to the straight air pipe 11 by way of a pipe 43. Deenergization of the magnet 40 permits a spring (not shown) to seat the application valve, for closing communication between the auxiliary reservoir 42 and the straight air pipe 11.

The relay valve device 6 is of the type adapted to operate in response to pressure of fluid supplied thereto by way of a pipe 44, which is in open communication with a brake application and release passage 45 in the brake control valve device 5, to supply fluid under pressure delivered by way of pipe 33 from the main reservoir 14 to the brake cylinder 17 by way of a pipe 46 for applying the brakes on the locomotive. The relay valve device 6 is operative in response to a reduction in the pressure of fluid in the pipe 44 to reduce the pressure of fluid in the brake cylinder 17 to a similar degree. In other words, the valve device 6 is operative to vary the pressure in the brake cylinder 17 in accordance with variations in the pilot or control pressure in pipe 44, in the usual manner.

The control valve device 5 comprises a service valve portion 47, an emergency valve portion 48, the interlock portion 18, a pipe bracket 49 and a filling piece 50. This control valve device 5, except for the interlock portion as previously mentioned, is the same as or similar in function and construction to the control valve device disclosed in the aforementioned patent. Since a detailed description of the intricate construction and operation of the service and emergency portions of the control valve device 5 is not essential to a clear understanding of the invention it is not deemed necessary to show and describe these parts in detail.

The interlock portion 18 (Fig. 2), which is employed to interlock the automatic and straight air controls of the brake system on the locomotive, comprises two double check valves 51 and 52 of the usual construction, a selector valve device 53 and an independent release valve 54.

The double check valve 51 is in the form of a piston arranged to control communication between the brake application and release passage 45 and either a passage 55 open to one end of said check valve, or a passage 56 open to the opposite end of the check valve. In the position in which the check valve 51 is shown in Fig. 2 the passage 45 is disconnected from the passage 56 and connected to passage 55. Upon movement of the check valve 51 to its upper position, passage 45 will be disconnected from passage 55 and connected to passage 56.

The double check valve 52 is like the double check valve 51 and is provided to control communication between passage 55 and either a straight air passage 57 at one end of the device or an independent application and release control passage 58 at the opposite end of the device.

The independent release valve 54 is provided for the purpose of controlling communication between passage 45 and a local atmospheric passage 59 and is provided on one side with a gasket 59a for engagement with a seat rib 60 and the closing thereby of the atmospheric passage 59. At the opposite side is a chamber 61 connected to a passage 62 and containing a spring 63 for urging the valve 54 to its seated position as shown in Fig. 2. Passage 62 leads to the selector valve device 53 and has a check valve 64 disposed in said passage to prevent back flow of fluid under pressure in the direction away from said selector valve device to the chamber 61. A restricted port 65 extends through the independent release valve 54 so as to connect chamber 61 with passage 45 to permit equalization of the fluid pressures acting on the opposite sides of said valve so that the spring 63 will be enabled to hold the valve 54 in the position for closing communication between passage 45 and the vent port 59.

The parts of the interlock portion 18 so far described are identical with the corresponding parts of the interlock portion shown and described in the aforementioned patent. However, in accordance with the invention the interlock portion 18 has been provided with the new and improved selector valve device 53.

This improved selector valve device 53 comprises a casing having therein a bore 66 which is in constant open communication with the main reservoir 14 by way of a passage 67, a branch pipe 68 and the main reservoir pipe 33. A slide valve 69 having an application position, in which it is shown in Fig. 2, and a release position, into and out of which it may be actuated, is mounted in the bore 66 for operation in a manner to be hereinafter described. Secured by any suitable means to the casing over the lower end of the bore 66 is a cap portion 70 with the interior thereof adjacent to the bore 66. This cap portion 70 contains a piston assemblage 71 for operating the slide valve 69, which assemblage also serves to close off the lower end of the bore 66 from the interior of the cap portion 70.

The piston assemblage 71 enclosed in the cap portion 70 comprises a sleeve member 72 clamped at its periphery between the cap portion 70 and a portion of the casing. A gasket 73 is provided to effect a seal between the sleeve member 71 and the casing, and thus prevents leakage of fluid under pressure around said sleeve member between bore 66 and the interior of cap portion 70. The sleeve member 72 has a through axial bore 74 in which a piston 75 is slidably mounted, the piston having at its inner or upper face a chamber 76 which is always connected to bore 60 and passage 67 and at its lower or outer face a chamber 77 which is constantly open to atmosphere by way of a port 78. The piston 75 is provided with a positively connected notched stem 79 connected to slide valve 69 by means of which said slide valve may be actuated as hereinafter described.

The piston assemblage 71 further comprises a piston member 80 of larger area than piston 75 and slidably mounted in a bore 81 in the cap portion 70. The piston member 80 has the chamber 77 at one face and at the other face a chamber 82, which latter chamber is in constant open communication by way of a passage 83 with the pipe 29 leading to the passage 28 in the independent brake valve device 2.

The piston member 80 is provided at its outer side with a guide portion 84 which is slidably carried in a reduced portion of the bore 81. In the inner face of the piston member 80 is a recess 85 having at the mouth thereof a series of radially inwardly extending projections 86 for sliding engagement with the outer periphery of the sleeve portion 87 of the sleeve member 72. At the bottom of the recess 85 is a boss 88 by means of which the piston 80 may engage and actuate the piston 75 within the sleeve 72.

It will thus be seen that, by reason of the guide portion 84 of the piston member 80 engaging the wall of the bore in cap portion 70 at one end of said piston member and the projections 86 of the piston member engaging the periphery of the sleeve 87 of the sleeve member 72, the piston member 80 is held in operative relation with the piston 75 independently of their relative alignment.

It will here be understood that the operation of the piston 75 and the associated slide valve 69 is controlled by the lockout valve mechanism 20 in the independent brake valve device 2. For example, when the independent brake valve handle 36 is in its normal raised position as shown in Fig. 1, the chamber 82 at the outer face of the piston member 80 is connected to atmosphere by way of passage 83 in the interlock portion 18, pipe 29, passage 28 in the independent brake valve device 2, chamber 26, past the unseated valve 23 to chamber 24 and the port 25. It will be remembered that chamber 77 is constantly open to atmosphere by way of port 78 and that the fluid in chamber 76 is always maintained at the pressure in the main reservoir 14 by way of the passage 67, branch pipe 68 and pipe 33. Thus, when the independent brake valve handle 36 is in its raised position fluid at main reservoir pressure acting on the inner face of the piston 75 preponderates and holds piston 75 in its lowermost or normal position in which it is shown in Fig. 2.

Now when it is desired to effect an independent release of the brakes, as described in the aforementioned patent, the handle 36 of the independent brake valve device 2 is depressed, by which movement the valve 23 is seated and the lockout valve 27 is unseated. Opening of the lockout valve 27 permits fluid under pressure to flow from the main reservoir 14 to the chamber 82 at the outer face of the piston member 80 by way of the passage 28, pipe 29 and passage 83 in the interlock portion 18. In response to this fluid at main reservoir pressure the piston member 80 is moved upward into engagement with the piston 75. With the opposing pressures acting on piston 75 and piston member 80 being the same, and, since as previously described, the area of the piston member 80 is greater than that of piston 75, the force of said piston member prevails to move the piston 75 in an upward direction. As the piston member 80 thus moves it acts through the medium of its boss 88, piston 75 and stem 79 to cause slide valve 69 to move upwardly to its independent release position, in which position an independent release of the brakes is effected in the same manner as that described in the aforesaid patent.

It should be mentioned at this point that, although the patent referred to herein discloses the use of fluid under pressure from the feed valve pipe, in the chamber corresponding to chamber 76 in this application, to effect the operation of a selector valve device, this application shows and describes the operation of the selector valve device 53 as being effected by fluid under pressure from the main reservoir 14. This has been done for the sake of accuracy because the use of main reservoir pressure as above described is now the general practice in railroad operation. It should be understood, however, that this change does not affect in any way the operation of the invention, nor a complete understanding of the same.

When the locomotive is run as a live engine, the handle of the cut-out cock 8 is positioned so that communication between the brake pipe 10 and the main reservoir pipe 33 is cut off and the equipment operates in identically the same manner as fully described in the aforementioned patent to control the brakes on the locomotive and the cars of the train.

If further information as to the function of the equipment when the locomotive is run as a live engine is desired, reference may be had to the prior, hereinbefore mentioned patent to E. E. Hewitt et al.

When a locomotive provided with this equipment is hauled dead in a train, it is desirable to condition the brake valve device 1 and master switch 3 so that neither can be operated unintentionally or otherwise interfere with the usual service control of the brakes on the train by the locomotive in control. In order to accomplish this the valve 101 of the double heading cock 7 is turned from the position in which it is shown in Fig. 1 of the drawings to a position in which both the brake pipe 10 and the service control pipe 38 are cut off from the brake valve device 1 so that the brake valve device 1 on the dead engine has no control over a service application of the brakes effected through the brake pipe 10 or the straight air pipe 11, nor over a subsequent release of such an application.

It will be understood that on the dead locomotive the handle of the brake valve device 1 will be maintained or carried in its running position and that the handle of the independent brake valve device 2 will be carried or maintained in its normally raised position. With the independent brake valve handle in its normal raised position as shown in Fig. 1, the lockout valves 23 and 24 therein will be positioned as shown in this figure and chamber 82 in the selector valve device 53 of the control valve device 5 will be vented by way of passage 83, pipe 29, passage 28 in the independent brake valve device 2, chamber 26, past unseated valve 23, chamber 24 and passage 25.

When the locomotive is being hauled dead in the train, the compressor on the dead locomotive will of course be inoperative and the compressed air for operating the brakes on the locomotive must then be supplied through the brake pipe from the locomotive in control of the train. In order to charge the main reservoir on the dead locomotive, the cut-out cock 8 on such locomotive is turned from its normal position, in which communication between the brake pipe 10 and the main reservoir pipe 33 is closed, to a position in which communication between said pipes is established. With communication between these pipes thus established, fluid under pressure flows from brake pipe 10 to the main reservoir pipe 33 and thereby to the main reservoir 14, through cut-out cock 8 and past the check valve and through a restricted port (not shown) in the combined strainer and check valve device 9.

Fuild at brake pipe pressure thus supplied to the main reservoir pipe 33 flows therefrom by way of the branch pipe 68 and the passage 67, which passage extends through the pipe bracket 49 and filling piece 50, to bore 66 and chamber 76 in the selector valve device 18. With the chamber 77 open to atmosphere by way of the port 78, and with chamber 82 open to atmosphere by way of passage 83, pipe 29, passage 28 in the brake valve device 2, past the normally unseated valve 23 to chamber 24 and thence by way of vent port 25, there is nothing to oppose downward movement of the piston 75 to its brake application position (if not already there) except its own friction and that of the slide valve 69 and the piston member 80. Consequently a slight increase in the pressure of fluid in chamber 76 will be sufficient to hold the piston 75 and the slide valve 69 in brake application position if they are already there, or if not, only an increase in pressure sufficient to overcome the above noted friction will be necessary to actuate the piston 75 and slide valve 69 to brake application position.

From the foregoing description, it will be noted that the chamber 77 is always open to atmosphere by way of port 78 and that it is cut off from the chamber 76 by the piston 75 and from chamber 82 by piston member 80. It should be understood that the port 78 is of such size that any leakage of fluid under pressure past piston 75 or piston member 80, or both, to chamber 77 will not cause a development of fluid pressure therein substantially above that of atmosphere. Consequently, the proper operation of the interlock portion 18 in response to the supply of fluid under pressure to and release of fluid under pressure from the chamber 82 is positively assured.

It will also be noted that piston 75 and piston member 80 are disposed in an improved and novel arrangement of such nature that they are not positively connected together, so that slight misalignment of the one with respect to the other will not adversely affect their operation, and yet the necessary relative areas are provided in the structure for properly positioning the slide valve 84.

In contrast to the present structure, the actuating piston in the corresponding selector valve device disclosed in the aforementioned patent is normally held, by reason of the pressure of fluid in the slide valve chamber acting on the piston exceeding the opposing pressure of a spring, in a position for permitting straight air application of the brakes. When the brake equipment of a locomotive is not charged with fluid under pressure, such as when it is not in a train, the spring holds the actuating piston and the slide valve in a position for an independent release of the brakes.

When a locomotive with this prior selector valve device is placed in a train to be hauled dead, the slide valve chamber of the device will be charged from the brake pipe through the usual cut-out cock, check valve and choke. By reason of the fact that the slide valve chamber is now being supplied with fluid under pressure from the brake pipe instead of from the main reservoir, the normal pressure of which on a live locomotive is much higher than that of brake pipe, and by reason of the aforesaid choke and of a spring acting on the check valve in a direction for seating it, the slide valve chamber is charged at a restricted rate and to a lower pressure than what is normally carried when the locomotive is live. Under these conditions, if leakage past the selector piston is sufficient with respect to the rate of increase in the pressure of fluid in the valve chamber, insufficient pressure will be developed in the slide valve chamber to compress the spring an amount sufficient to actuate the piston over its full travel. Consequently, the slide valve will not be moved to a position to provide the proper port registration for permitting a normal straight air brake application to be effected by the leading locomotive.

In this improved selector valve device 53 there is no spring opposing downward movement of the piston 75 and the associated slide valve 69, so that only an increase in fluid pressure sufficient to overcome the friction of the piston and slide valve is required. Since kinetic friction is lower than static friction, their downward movement once started will continue until the slide valve is in straight air brake application position, in which it is shown in the drawing.

It will thus be seen that, by reason of the novel arrangement of opposing pistons having different effective areas and with a chamber between them open to atmosphere, there has been provided an improved and compact means for positively moving the selector valve slide valve to the straight air brake application position upon the locomotive equipment being charged with fluid under pressure from the brake pipe 10 while being hauled dead.

Having now described my invention, what I claim as new and desire to secure by Letters Patent is:

1. In a fluid pressure brake, in combination, a valve having a brake application position and a brake release position, a source of supply of fluid under pressure, a first chamber constantly connected to said source of supply, a second chamber constantly open to atmosphere, a third chamber at one time supplied with fluid under pressure from said source of supply and at another time vented to atmosphere, a tubular member disposed in said second chamber having one end open to said first chamber and the other end open to said second chamber, a first piston slidably mounted in said member and connected to said valve, a second piston slidably mounted upon said tubular member between said second chamber and said third chamber for engaging and actuating said first piston, said second piston being operative in response to the pressure of fluid in said third chamber to engage said first piston and through the medium thereof to actuate said valve to said brake release position, and said first piston and said valve being operative to said brake application position by pressure of fluid in said first chamber upon venting of fluid from said third chamber.

2. In a fluid pressure brake, in combination, a source of supply of fluid under pressure, a first chamber in constant open communication with said source of supply, a valve disposed in said first chamber having a brake application position and a brake release position, a second chamber constantly open to atmosphere, a first piston for actuating said valve subject at one side to the pressure of fluid in said first chamber and at the other side to the atmospheric pressure in said second chamber, a guide member slidably supporting and encircling said first piston, a third chamber at one time supplied with fluid under pressure and at another time vented to atmosphere, and a second piston of greater area than said first piston and subject on one side to the atmospheric pressure in said second chamber and on the other side to the pressure of fluid in said third chamber, said second piston encircling said guide member and being operative in response to an increase in the pressure of fluid in said third chamber to engage said first piston and through the medium thereof to actuate said valve to said brake release position, and said first piston and said valve being operative to said brake application position by pressure of fluid in said first chamber upon venting of fluid from said third chamber.

3. A fluid pressure control valve device comprising a casing having an open-ended bore, a cup-shaped element secured to said casing over the open end of said bore and having internally a piston bore, a member disposed in said open-ended bore clamped between said casing and said element, said member comprising a sleeve of smaller diameter than said piston bore open at opposite ends and extending into said piston bore, a piston slidably mounted in said sleeve, a piston slidably mounted in said piston bore and comprising means for contacting and moving the first named piston, said pistons serving to define a chamber between their adjacent faces, means opening said chamber to atmosphere, means for conveying fluid under pressure to act on the opposite face of the first named piston, and means for supplying fluid under pressure to and releasing fluid under pressure from the opposite face of the second mentioned piston.

4. A fluid pressure control valve device comprising a casing having a sleeve with an open-ended bore terminating therein, a cup-shaped member secured to said casing over the open end of said bore and having internally a piston bore of larger diameter than said sleeve, a piston in said casing slidably mounted in said sleeve, a movable member operatively mounted in said casing for movement by said piston, a piston slidably mounted in said piston bore and comprising means for contacting and moving the first named piston and thereby said movable member, said pistons serving to define a chamber between their adjacent faces, means opening said chamber at atmosphere, means for conveying fluid under pressure to act on the opposite face of the first named piston, and means for supplying fluid under pressure to and releasing fluid under pressure from the opposite face of the second mentioned piston.

5. A fluid pressure control valve device comprising casing means having a sleeve with an open-ended bore terminating therein, a cup-shaped member secured to said casing over the open end of said bore and having internally a piston bore of larger diameter, a movable member operatively mounted in said casing, a piston in said casing slidably mounted in said sleeve for actuating said movable member, a piston slidably mounted in said piston bore and comprising means for contacting and moving the first mentioned piston and thereby said movable member, said pistons serving to define a chamber between their adjacent faces, means opening said chamber to atmosphere, means for conveying fluid under pressure to the opposite face of the first named piston, and means for supplying fluid under pressure to and releasing fluid under pressure from the opposite face of the second mentioned piston.

6. A fluid pressure control valve device comprising casing means having a sleeve with an open-ended bore terminating therein, a cup-shaped member secured to said casing over the open end of said bore and having an internal piston bore of larger diameter than that of said sleeve, a movable member operatively mounted in said casing, a piston in said casing slidably mounted in said sleeve for actuating said movable member, a piston slidably mounted in said piston bore and comprising means for contacting and moving the first mentioned piston and thereby said movable member, the second named piston being provided with a guide portion for reciprocal movement in a portion of said piston bore, both of said pistons serving to define a chamber between their adjacent faces, means constantly connecting said chamber to atmosphere, means for conveying fluid under pressure to the opposite face of the first named piston, and means for supplying fluid under pressure to and releasing fluid under pressure from the opposite face of the second named piston.

7. A fluid pressure control valve device comprising casing means having a sleeve with an open-ended bore terminating therein, a cup-shaped member secured to said casing over the open end of said bore and having internally a piston bore of larger diameter, a movable member operatively mounted in said casing, a piston in said casing slidably mounted in said sleeve for actuating said movable member, a piston slidably mounted in said piston bore and comprising means for contacting and moving the first mentioned piston and thereby said movable member, said pistons serving to define a chamber between their adjacent faces, means opening said chamber to atmosphere, means for supplying fluid at a certain degree of pressure to the opposite face of the first mentioned piston, and means for supplying fluid at said certain degree of pressure to and for releasing fluid under pressure from the opposite face of the second mentioned piston.

8. A fluid pressure control valve device comprising a casing having an open-ended bore, a cup-shaped element secured to said casing over the open end of said bore and having internally a piston bore in coaxial relation to said open-ended bore, a member disposed in said open-ended bore clamped between said casing and said element, said member comprising a sleeve of smaller diameter than said piston bore open at opposite ends and extending into said piston bore, a piston slidably mounted in said sleeve, a piston slidably mounted in said piston bore and comprising means for contacting and moving the first named piston, said pistons serving to define a chamber between their adjacent faces, means opening said chamber to atmosphere, means for conveying fluid under pressure to act on the opposite face of the first named piston, and means for supplying fluid under pressure to and releasing fluid under pressure from the opposite face of the second mentioned piston.

ROBERT E. WATSON.

REFERENCES CITED

The following references are of record in the file of this patent:

UNITED STATES PATENTS

| Number | Name | Date |
|---|---|---|
| 1,964,072 | Neveu et al. | June 26, 1934 |